United States Patent [19]

Steiner

[11] Patent Number: 4,683,626
[45] Date of Patent: Aug. 4, 1987

[54] TOOL HOLDER FOR A MACHINE TOOL
[75] Inventor: Karl Steiner, Vienna, Austria
[73] Assignee: Maschinenfabrik Heid Aktiengesellschaft, Vienna, Austria
[21] Appl. No.: 807,093
[22] Filed: Dec. 10, 1985
[30] Foreign Application Priority Data
Dec. 10, 1984 [AT] Austria ................................. 3913/84
[51] Int. Cl.⁴ .............................................. B23B 3/16
[52] U.S. Cl. ........................................... 29/40; 29/39; 82/2 B; 82/36 A
[58] Field of Search ...................... 82/36 A, 2 R, 2 B; 29/39, 40

[56] References Cited
U.S. PATENT DOCUMENTS
4,080,853  3/1978  Goto ...................................... 82/2 R
4,327,612  5/1982  Bazuin ............................. 82/36 A X
4,571,796  2/1986  Sellner et al. ..................... 82/2 R X
4,576,069  3/1986  Bazuin ............................. 82/36 A X Primary Examiner—Gil Weidenfeld
Assistant Examiner—Steven C. Bishop
Attorney, Agent, or Firm—Karl F. Ross; Herbert Dubno

[57] ABSTRACT

A tool holder is mounted upon the crossfeed arrangement of a machine tool, e.g. a lathe, and have a swing part which is rotatable about one axis, a cutter head which is rotatable relative to the swing part about a second axis perpendicular to the first axis, the first axis being orthogonal to a plane of displacement of said crossfeed arrangement. Means is provided for the programmed positioning of the head relative to the swing part and the swing part relative to the crossfeed arrangement so that the angular positions of the cutter can be effected under programming control within wide range of angular orientations and receiving outside the X-Z plane is possible.

13 Claims, 12 Drawing Figures

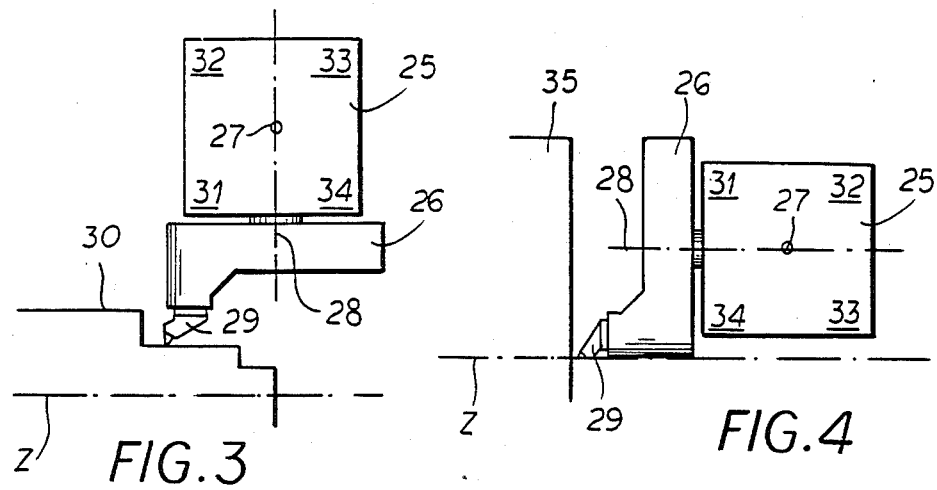
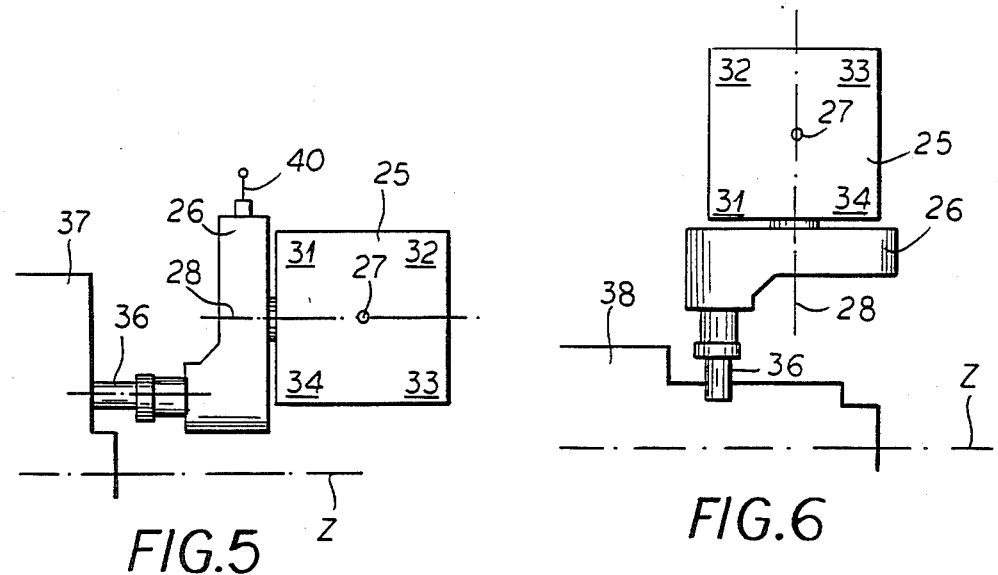
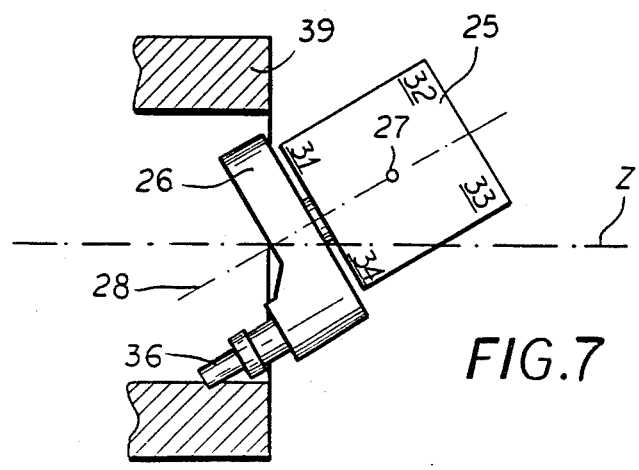

TOOL HOLDER FOR A MACHINE TOOL

FIELD OF THE INVENTION

My present invention relates to a tool holder and, more particularly, to a tool holder for a machine tool having a cross-slide upon which the tool holder is mounted.

BACKGROUND OF THE INVENTION

So called flexible machining centers are generally provided to carry out a number of machining operations on a workpiece and can be provided to enable the workpiece and the tools which are used to be changed or replaced, Such machining centers can be inclined-bed machines with tool and workpiece change mechanisms, magazines for the tools and a programming control, e.g. a numerical control computer system, which effects a series of machining operations, generally utilizing several tools on a given workpiece and then initiates a workpiece replacement operation.

Such machines may require material removal from a workpiece to be effected along two machining paths or directions which include an angle, for example, a right angle, with one another. For this purpose, it is advantageous to be able to position the tool holder so that the tool can machine in either of two directions.

OBJECT OF THE INVENTION

It is the principal object of the present invention to provide a tool holder of the latter type which is of simple construction, high reliability and high versatility.

SUMMARY OF THE INVENTION

This object and others which will be apparent hereinafter can be attained, in accordance with the invention which provides on the cross-slide of a machine tool of the type described, e.g. a lathe, a tool holder which comprises a mechanism defining two axes of relative rotation including an angle with one another, preferably a right angle, with one side of the tool holder being mounted on the cross-slide while the other side of the tool holder carries a fixed-orientation or rotatable tool.

According to the invention, means is provided for rotating the holder or a part thereof about one or both of these axes and for selecting the angular orientation of the tool or the tool about one or both of these axes so that a variety of working positions about one or both axes can be selected for the rotary position of a tool holder can be controlled in accordance with a program, e.g. by the numerical controller, during the machining operation.

It has been found to be advantageous to provide the tool holder with a swing part and a tool head, the swing part being angularly displaceable on the cross-slide about an axis lying normal to the plane of movement of the cross-slide in cutting operation, i.e. parallel to a Y axis, while the cutter head is angularly displaceable on the swing part about an axis lying parallel to this plane and preferably parallel to the X axis.

The axes which will be referred to hereinafter thus include the Z axis, i.e. the longitudinal axis of a workpiece held between the headstock and the tailstock of the lathe and about which the workpiece can be rotated, the X axis which is perpendicular to the Z axis but is parallel to the plane of cross-slide displacement, and the Y axis which is perpendicular to both the X axis and the Z axis and thus is normal to the plane of cross-slide displacement.

Either or both of the swing part and the head can be program controlled, i.e. angularly displaced about the respective axis in accordance with a predetermined cutting program which can also control the displacement of the holder by the cross-slide, i.e. via the leadscrews which displace the cross-slide elements in the longitudinal direction and in a transverse direction which is parallel to the X axis as noted previously.

With the present invention, the tool can be disposed or oriented radially with respect to the main machine axis or axially relative thereto, i.e. parallel to the main machine axis or in line therewith.

In a specific embodiment of this invention, the cutter head is provided with means for receiving at least two tools, hereinafter referred to also as cutters, and the means for receiving a tool can be considered a socket or seat in which the tool is received.

Preferably one socket or seat receives a fixed tool, e.g. a lathe cutter bit, while the other socket or seat receives a rotatably driven tool, e.g. a milling or grinding cutter or wheel.

It has been found to be advantageous to increase the versatility of machining by allowing rotation about the Y axis mentioned previously into a plurality of angular positions so that off radial positions of the cutter may also be assumed. It has been found to be advantageous in this case to provide a digital positioning device with indexing between the cross-slide and the swing member and/or between the swing member and the cutter head. This allows the cutting force of the tool to be applied in a wide variety of positions selected at will by the programming. In fact, with this system a swinging movement of the cutter can be effected in the course of a machining operation and not only to position the tool for a machining operation. Indeed the present invention also provides for a stepless drive or interpolation device for the cutter head and/or the swing part.

A machining in the direction of the Y axis can also be effected in the latter case when the cross-slide or the slide carrying the holder does not provide for a Y feed.

In the latter case, the Y axis cut during machining operation can be effected by a corrective displacement of the crossfeed parallel to an axis in or parallel to the crossfeed plane and, therefore, the transverse feed axis X and the longitudinal feed axis Z.

I have found it to be advantageous, moreover, to provide the cutter head with a measuring device, e.g. a dial indicator, whose sensor can be brought into play when rotating the cutter head through 180° so that the machining operation can be directly monitored. The measuring device can hae an element which can be pressed in to measure the workpiece and preferably has an interchangeable tip or end which can be replaced to allow different shapes to be sensed.

BRIEF DESCRIPTION OF THE DRAWING

The above and other objects, features and advantages of the present invention will become more readily apparent from the following description, reference being made to the accompanying drawing in which:

FIGS. 3–7 are views illustrating various positions which can be assumed by a fixed cutter or a rotatable cutter which can be substituted for a fixed cutter in accordance with the principals of this invention.

SPECIFIC DESCRIPTION

Figure 1:
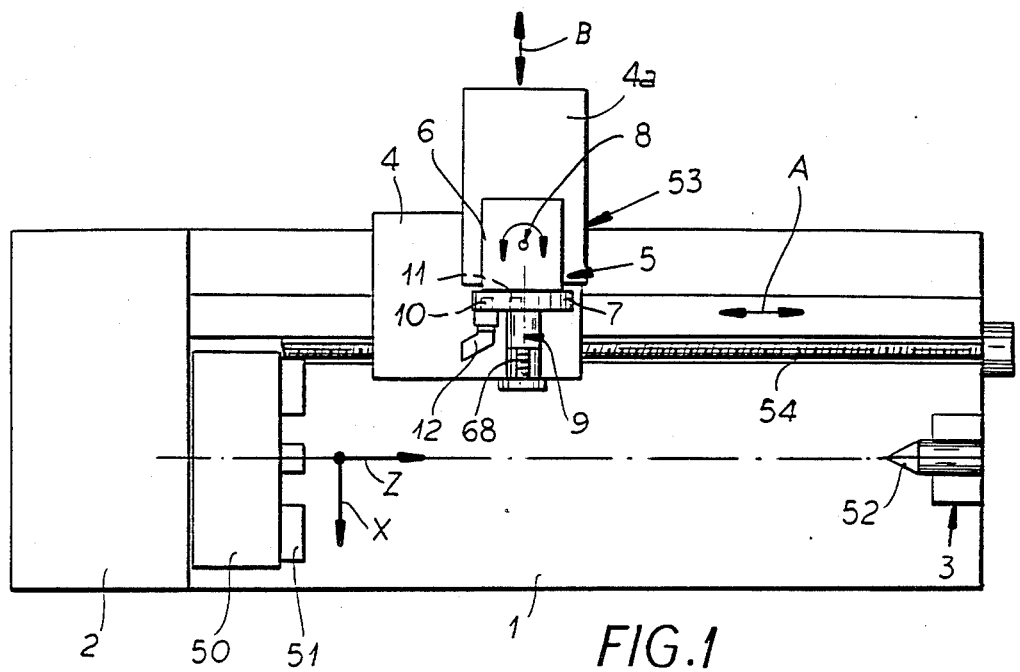
FIG. 1 is a highly diagrammatic plan view illustrating an aspect of the present invention.

A typical machine tool with which the invention is applicable is a lathe shown in highly diagrammatic form in FIG. 1. The lathe comprises an inclined bed 1 having an inclined crossfeed arrangment which is similar to that shown in FIG. 2 and therefore has not been illustrated in side view or in cross section. At one end of the bed, the headstock 2 is provided and rotatably drives a chuck 50 whose jaws 51 can receive a workpiece which is thus rotatable about the main machine axis or the longitudinal axis of the workpiece, namely, the Z axis as can be seen in FIG. 1. The opposite end of the workpiece is supported in a tailstock 3 by a center 52 as is well known in the lathe arts as is also clear from the lathe arts, a cross-slide or crossfeed arrangement 53 can be provided and can include a longitudinal table 4 displaceable by a leadscrew 54 parallel to the Z axis as represented at A and a cross-slider 4a which is displaceable parallel to the X axis as has been illustrated in FIG. 2. This direction of displacement has been represented at B in FIG. 1.

According to the invention, the two-part tool holder 5 comprises a swing part 6 which can be rotated about an axis 8 which is orthogonal to the plane defined by the directions A and B that hence a plane parallel to the Z axis and to the X axis.

Figure 2:
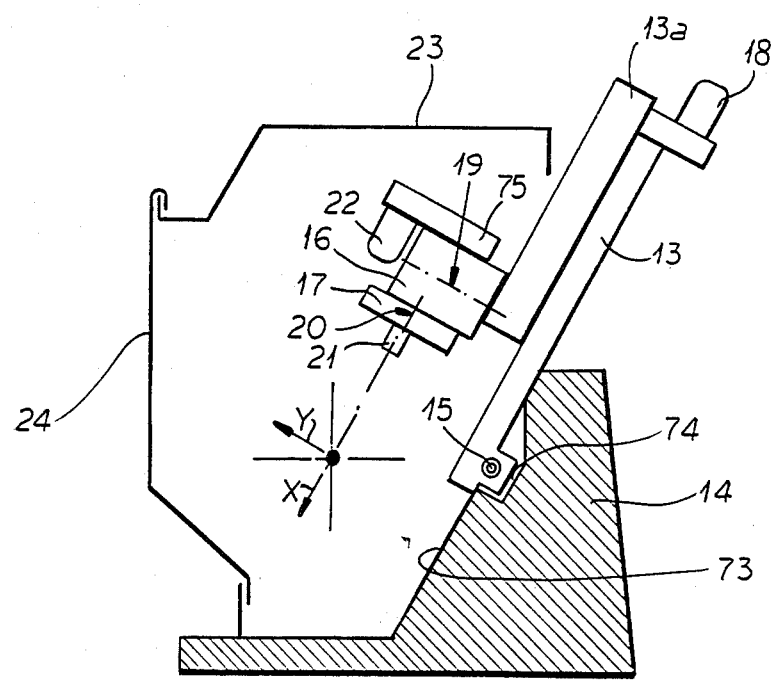
FIG. 2 is a similarly diagrammatic cross-sectional view taken in a vertical plane transverse to the lonitudinal axis of the machine of FIG. 1 but illustrating a modified system.

The swing part 6 rotatably carries a cutter head 7 which can be rotated relative to the swing part 6 about an axis 9 orthogonal to the axis 8 and parallel to the X axis (see also FIG. 2).

The cutter head 7 is provided with two seats or sockets 10 and 11, respectively, offset by about 60° about the axis 9, in the first of which a fixed position cutter or tool bit 12 can be received for longitudinal turning or facing while the other socket or seat 11 can receive a rotatable tool such as a milling cutter.

Figure 1A:
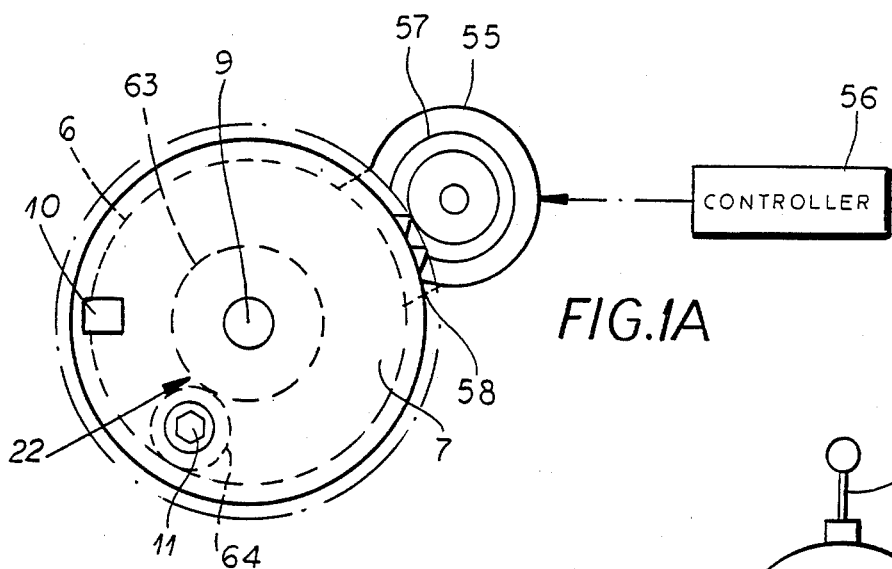
FIG. 1A is a diagrammatic end view of another cutter head in accordance with the invention utilizing principles discussed in connection with FIG. 1.

Referring now to FIG. 1A where the principles of the invention are shown in somewhat greater detail, it can be seen that the swing part 6 which is shown only in broken lines in FIG. 1A can serve as a support for an electric motor (computer commanded servomotor) 55 which is driven by the numerical controller or programmer 56 determining the sequence of machining operations and, of course, having outputs to the headstock and tailstock, if desired, for replacement of workpiece, to a magazine for automatic change of tools or other outputs necessary for an automated machining operation.

Figure 1B:
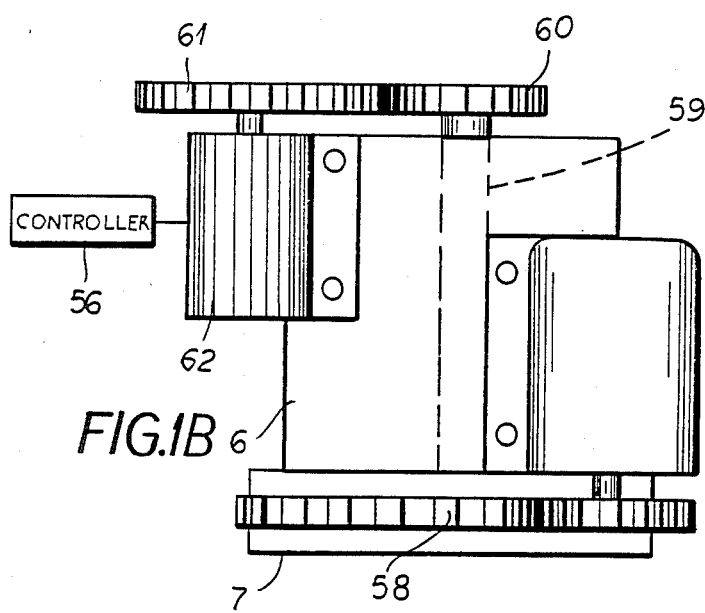
FIG. 1B is a diagrammatic plan view of the tool holder of the invention which can be utilized on a cross-slide of the type shown in FIG. 1.

The motor 55 has a gear 57 which drives a gear 58 on the cutter head 7. In addition, a shaft (FIG. 1B) represented at 59 can extend through the swing part 6 and can have a gear 60 driven by a gear 61 of still another motor 62 operated by the controller 56 and driving, via the shaft 59, a gear 63 located within the head 7 and coupled to a pinion 64 which rotates the socket 11 and thus a milling cutter received therein.

Thus it will be apparent that head 7 comprises two sockets or seats 10 and 11, one of which is provided for a fixed orientation cutter or tool bit 12, while the other serves for driving a rotatable tool (e.g. the tool 36 which is described below).

In this case, the drive mechanism 22 formed by the gear 63 and 64 is located at least in part in the swing part 6 or in the head 7 or is mounted on the swing part.

Figure 1D:
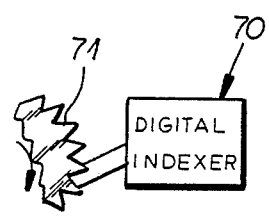
FIG. 1D illustrates diagrammatically a digital indexer which can be utilized between the cutter head and the swing piece or between the swing piece and the cross-slide of the invention.
Figure 1C:
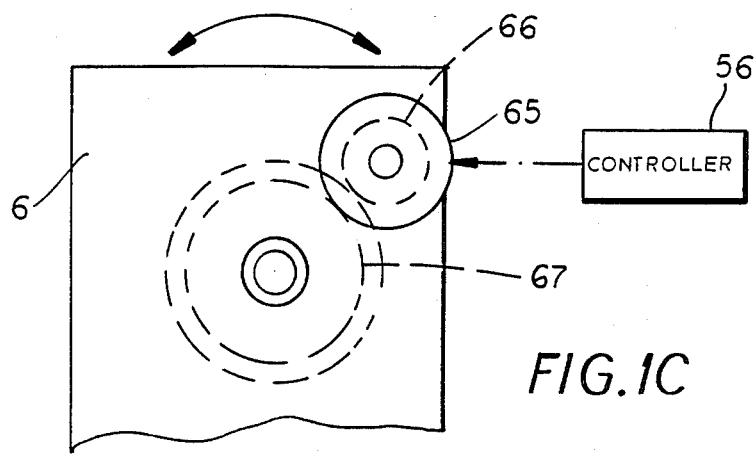
FIG. 1C is a diagram of a mechanism for rotating the swing piece about its Y axis normal to the plane of the cross-slide.

The controller 56 also can operate a positioning motor 65 whose gear 66 drives a gear 67 connected to the swing part 6. The motor 65 can be mounted on the crosstable 4A of the cross-slide but so as to move with the swing part 6 when the latter is displaced by the leadscrew 68 controlling the crossfeed motion. In this case, therefore, even the swing of the swing part 6 can be controlled by the numerical controller or machining computer in accordance with a program. When a digital output is provided by the controller it is possible to use a digital indexing device represented highly diagrammatically at 70 in FIG. 1D shown to be stepping a toothed arrangement 71 on a rotating part, e.g. the swing part 6 or the head 7, while the indexer is on a part with respect to which the rotating part can be angularly displaced.

Referring to FIG. 2, it can be seen that the longitudinal table 13 is displaced by a leadscrew 15 along the inclined bed 14 which is provided with an inclined support 73 for this purpose and, of course, a guideway 74.

The transverse feed is here affected in the X direction by a motor 18 driving a leadscrew which operates the crossfeed table 13a. Here the swing part is shown at 16 and is rotatable about an axis 19 parallel to the Y axis represented in this Figure while the cutter head 17 carrying the cutter 21 is rotatable about the axis 20. The tool 21 can be a milling cutter driven by the motor 22 via a transmission represented in part at 75 in this Figure. Here the headstock is shown at 23 and the front of the machine can be closed by a cover 24 which can be removed to afford access to the working position.

FIGS. 3 through 7 illustrate various positions which can be assumed by a tool 29 of the fixed position type or a milling cutter 36 of the rotatable type. Different workpieces are shown in these Figures and will be described in connection therewith. Assuming that it is desired to cut steps in a rotating workpiece 30 as seen in FIG. 3, the head 26 is rotated about the X axis 28 to position the tool 29 parallel to the Z axis about which the workpiece 30 is rotated. The corners 31, 32, 33 and 34 have been numbered on the swing part 25, which is rotatable about the Y axis 27 as previously described. This corner numbering allows the positions of the swing part to be readily ascertained in each Figure. In this case, Z axis displacement is provided by the longitudinal feed, e.g. the leadscrew 54. In this case and in all cases in which a fixed orientation tool bit is used, the seat 11 can be closed to prevent chips and dirt from entering.

In a facing operation, however, for the workpiece 35 which is also rotated about the Z axis (FIG. 4), the head 26 is swung through 180° about the axis 28 so that the tool 29 is proximal to the corner 34 whereas previously it was proximal to the corner 31 (compare FIGS. 3 and 4) In addition, the swing part 25 is rotated through 90° in the clockwise sense so that the corner 31 is in the upper left quadrant whereas previously it was in the lower left quadrant. The facing operation can now be effected by crossfeed displcement in the direction B (FIG. 1) by the leadscrew 68.

With the swing part 25 in the position shown in FIG. 4, a milling cutter can be placed in the rotatable seat or socket 11 as shown at 36 in FIG. 5 and a milling operation in the radial direction can be effected by displacing the cross-slide 4a in the direction of arrow B. Axial cutting using a milling cutter can be effected by the longitudinal feed in the direction of arrow A on the workpiece 37 which is also rotated about the axis Z.

Of course, the system of FIG. 5 utilizes an end mill and it is aalso possible to utilize a side cutting mill as shown in FIG. 6 with rotation of the swing part 25 through 90° in the counterclockwise sense from the position shown in FIG. 5. The longitudinal feed is here operated to effect a lateral cut in the rotating workpiece 38. The head 26, of course, can be now rotated through 180° about the axis 28 so that the cutter 36 lies proximal to the corner 31.

With the apparatus of the invention it is possible to angularly displace either the head 26 or the swing part 25 through any fraction of a rotation about the respective axis 28 or axis 27 as has been illustrated diagrammataically in FIG. 7 utilizing the drives 55 and 65 or 70, 71 previously mentioned.

Figure 8:
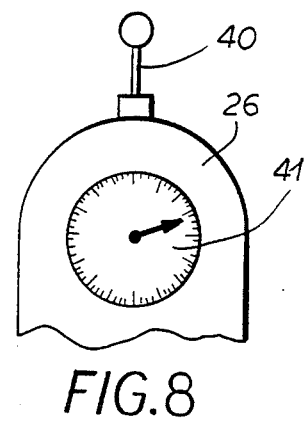
FIG. 8 is a diagram showing a portion of the cutter head of FIG. 5 provided with a dial indicator which can be utilized for measuring purposes if the cutter head is rotated through 180°.

Note that the cutter can also carry a measuring device enabling measurement of the cut which must be undertaken or which has been undertaken. This measuring device can be a sensor 40 which can be depressed into the cutter head to operate a dial-type indicator as represented at 41 in FIG. 8 and is replaceable by the sensors to allow measurement of various shapes.

It will be apparent that with the high versatility of the angular displacements permitted for the head and the swing part and thus of the cutter 12 or the cutter 36, it is possible to effect machining operations within the X-Z plane as well as outside the X-Z plane.

I claim:

1. A machine tool, comprising:
an elongated machine-tool bed;
a headstock at one end of said bed provided with means for rotating a workpiece about a longitudinal axis extending along said bed, said bed forming a track generally parallel to said axis;
a longitudinal slide shiftable along said track on said bed generally parallel to said longitudinal axis in a first rectilinear direction;
a crossfeed arrangement on said longitudinal slide;
a tool holder mounted on said crossfeed arrangment and provided with a cutter, and means for swinging said cutter angularly about two distinct cutter-swing axes including an angle with one another and one of which is generally perpendicular to a plane of movement of the tool holder; and
cutting-program-control means connected at least to said means for swinging said cutter for angularly displacing said cutter automatically, steplessly and under control of a cutting program about each of said cutter-swing axes during the course of material-removal machining of said workpiece by said cutter.

2. The machine tool defined in claim 1 wherein said tool holder comprises a swing part displaceable angularly about one of said cutter-swing axes which is orthogonal to said plane, and a cutter head rotatable on said swing part about a second of said cutter-swing axes forming a right angle with said one of said cutter-swing axes.

3. The machine tool defined in claim 2 wherein said second axis lies parallel to said plane.

4. The machine tool defined in claim 2 wherein said cutter head is provided with at least two seats for respective tools interchangeably mounted in said seats, one of said tools being a fixed orientation cutting tool and the other of said tools being a rotating cutting tool.

5. The machine tool defined in claim 3, further comprising a digital positioning device with indexing for positioning said head relative to said swing part.

6. The machine tool defined in claim 3, further comprising a digital positioning device with indexing for positioning said swing part relative to said crossfeed arrangment.

7. The machine tool defined in claim 3, further comprising a stepless drive for angularly displacing said head relative to said swing part.

8. The machine tool defined in claim 3, further comprising a stepless drive for angularly displacing said head relative to said crossfeed arrangment.

9. The machine tool defined in claim 3 wherein said cutter head is provided with at least one measuring device engageable with a workpiece for providing an indication of a dimension thereof on said cutter head.

10. The machine tool defined in claim 3 wherein said cutter head is a rotatable cutter and at least part of a drive for rotating said cutter is built into said swing part.

11. The machine tool defined in claim 3 wherein said cutter head is a rotatable cutter and at least part of a drive for rotating said cutter is built into said cutter head.

12. A machine tool, comprising:
an elongated machine-tool bed;
a headstock at one end of said bed provided with means for rotating a workpiece about a longitudinal axis extending along said bed, said bed forming a track generally parallel to said axis;
a longitudinal slide shiftable along said track on said bed generally parallel to said longitudinal axis in a first rectilinear direction;
a cross slide mounted on said longitudinal slide and provided with a crossfeed drive for displacing said cross slide rectilinearly in a second direction generally transversely of said first direction;
a tool holder mounted on said cross slide and provided with a cutter, and means for swinging said cutter angularly about two distinct cutter-swing axes including an angle with one another and one of which is generally perpendicular to a plane of movement of the tool holder defined by said direction, the swinging movement of said cutter about said cutter-swing axes being the exclusive movement permitted said cutter relative to said cross slide and the displacement of said cross slide in said second direction being the exclusive movement of said cross slide permitted relative to said longitudinal slide; and
cutting-program-control means connected at least to said means for swinging said cutter for angularly displacing said cutter automatically, steplessly and under control of a cutting program about each of said cutter-swing axes during the course of material-removal machining of said workpiece by said cutter.

13. The machine tool defined in claim 12 wherein said tool holder comprises a swing part displaceable angularly about one of said cutter-swing axes which is orthogonal to said plane, and a cutter head rotatable on said swing part about a second of said cutter-swing axes forming a right angle with said one of said cutter-swing axes.

* * * * *